Aug. 28, 1951  R. KERR  2,565,856
VEHICLE ESCAPE HATCH OPERATING MECHANISM
Filed Sept. 2, 1949
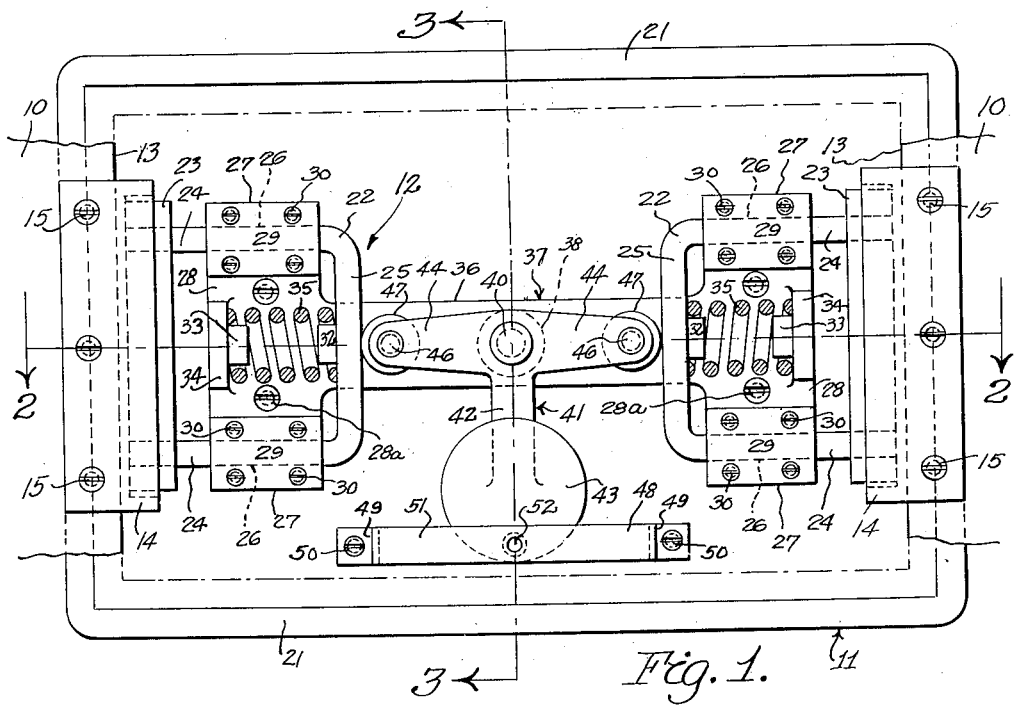
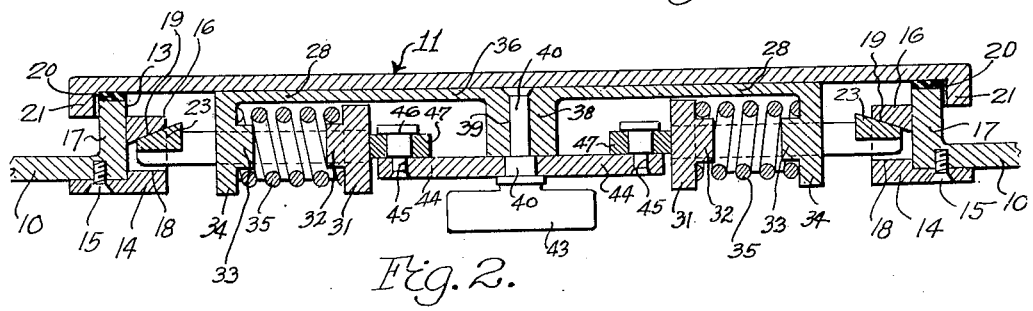
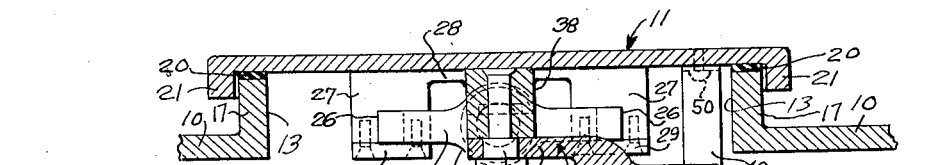
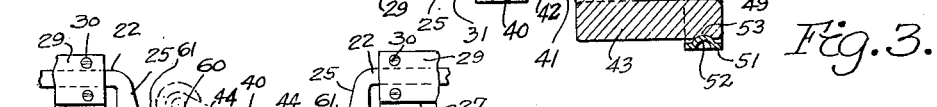
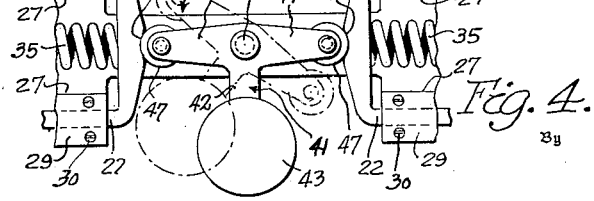
Inventor
Robert Kerr
Barthel & Bugbee
Attorneys Patented Aug. 28, 1951

2,565,856

UNITED STATES PATENT OFFICE 2,565,856

VEHICLE ESCAPE HATCH OPERATING MECHANISM

Robert Kerr, Detroit, Mich.

Application September 2, 1949, Serial No. 113,857

6 Claims. (Cl. 292—21)

This invention relates to vehicle roof escape hatches, and in particular, to operating mechanism for such hatches.

Hitherto, many fatalities have occurred in highway accidents where passengers have been trapped inside a burning bus by the jamming of the regular and emergency doors. Escape hatches in the roofs of such vehicles have been hitherto proposed, some of them with automatic operating mechanism, but some of these mechanisms have been of doubtful value because of the possibility of their pivots or sliding surfaces locking by reason of rust or dirt, and by friction around pulleys or pivots. Certain such mechanism employing cables have also been subject to stretch in such cables and have required adjustment.

One object of the present invention is to provide an operating mechanism for a vehicle roof escape hatch which is substantially free from the possibility of not functioning in an emergency by reason of rust or dirt, and which will operate automatically to withdraw the latches from the hatch in response to the overturning of the vehicle, so that the hatch automatically drops off by its own weight or can be easily pushed off, thereby permitting the persons inside the vehicle to escape through the hatch opening and avoid their being trapped inside the vehicle.

Another object is to provide an operating mechanism for a vehicle roof escape hatch wherein the hatch is locked in the roof opening by means of oppositely movable bolts which are urged by springs into their unlatching positions but are held in their latching positions by a pendulum-operated device which swings into a bolt-releasing position if the vehicle turns over on its side.

Another object is to provide an operating mechanism for a vehicle roof escape hatch wherein the pendulum is mounted on one arm of a T-shaped lever having rollers on the opposite ends of its cross bar engaging the bolts and temporarily preventing them from moving into their unlatching positions.

Another object is to provide an operating mechanism for a vehicle roof escape hatch of the foregoing character wherein the rollers engage detent notches or recesses in the ends of the latch bolts and are thus prevented from being dislodged by ordinary jolts during travel, while instantly dislodged by the overturning of the vehicle.

In the drawings:

Figure 1 is a bottom plan view of a vehicle roof escape hatch and its operating mechanism, according to one form of the invention, with the major portion of the roof broken away to disclose the hatch mechanism more clearly;

Figure 2 is a central vertical longitudinal section taken along the line 2—2 in Figure 1;

Figure 3 is a central vertical cross-section taken along the line 3—3 in Figure 1; and Figure 4 is a fragmentary bottom plan view of a modification of the operating mechanism shown in Figure 1.

Referring to the drawings in detail, Figure 1 shows portions of a vehicle roof 10 of a motor vehicle, such as a motor bus, having an escape hatch, generally designated 11, releasably held in position by automatically releasable locking mechanism, generally designated 12, to cover an opening 13 in the roof 10. The locking mechanism 12 includes a pair of keepers 14 secured as at 15 to the roof 10, the keepers 14 being of L-shaped or angle cross-section having a flange 16 extending along the flange 17 surrounding the opening 13. The keeper flange 16 has a recess 18 with an inclined wall 19 to provide a wedging action. The roof opening flange 17 is provided with a gasket 20 of elastic deformable material, such as rubber or synthetic rubber, in order to seal the opening 13 against the entrance of water, and the hatch 11 is provided with a lip or flange 21 extending outside the flange 17 surrounding the roof opening 13.

Coacting with the recesses 18 of the keepers 14 are two oppositely disposed U-shaped bolts or latch members 22 having wedge-shaped bars 23 coacting with the wedging surfaces 19 to wedge the hatch 11 firmly down against the gasket 20. The U-shaped bolts 22 consist of two arms 24 interconnected by a bridge portion 25 and by the bars 23. The arms 24 are parallel to one another and pass through guide slots 26 in parallel blocks 27 secured to base plates 28 which in turn are secured as at 28a (Figure 3) to the underside of the hatch 11. The slots 25 are closed by cover plates 29 secured to the blocks 27 by the fasteners 30. In this manner, the arms 24 of the U-shaped bolts 22 are accurately guided in their reciprocation, and they are maintained in parallelism by the bars 23 and bridge portions 25. The bridge portion 25 of each bolt 12 is provided with a central enlargement 31 (Figure 3) from which a lug or boss 32 extends inwardly. Aligned with the boss 32 is a corresponding boss 33 on an abutment 34 which rises from the base plate 28. Encircling the bosses 32 and 33 and abutting the enlargement 31 and abutment 32 is a compression spring 35 which urges the bolt 25 and wedging bar 23 toward its unlatching position.

The base plates 28 are interconnected by a bridge plate 36 (Figures 1 and 2), thereby forming an H-shaped supporting and guiding structure, generally designated 37. Projecting downwardly from the center of the bridge plate 36 is a boss 38 which is bored as at 39 (Figure 2) to receive a headed pivot pin 40. Pivotally mounted on the pivot pin 40 and engaging the end of the boss 38 is a T-shaped lever 41 (Figure 1), the central arm 42 of which carries a pendulum weight 43 for swinging the lever 41 to and fro in response to the action of gravity. The opposite ends of the cross arm 44 of the T-lever 41 are bored as at 45 to receive headed pivot pins 46 on which rollers 47 are rotatably mounted (Figure 2). The rollers 47 (Figure 1) engage the centers of the bridge portions 25 of the U-shaped bolts 22 so as to prevent the bolts 22 from being urged into their unlatched positions by the compression springs 35. In order to prevent the pendulum weight 43 and lever 41 from swinging to and fro under the influence of ordinary jolts arising during ordinary travel, a yieldable detent is provided consisting of a bracket or keeper 48 having arms 49 secured as at 50 to the underside of the hatch 11 and having a bridge portion 51 with a protuberance 52 formed on the inner side thereof and yieldingly engageable with the corresponding depression 53 in the pendulum weight 43.

The modification, generally designated 60, shown in Figure 4, is similar in all respects to the form shown in Figures 1 to 3 inclusive except in the manner of preventing operation in response to ordinary jolts in everyday travel. In Figure 4, the bridge portions 25 of the bolts 22 are provided at their centers with notches 61 into which the rollers 47 yieldingly project. Ordinary jolts are thus insufficient to force the rollers 47 out of the notches 61, hence the T-lever 41 with its pendulum weight 42 is incapable of swinging in response to ordinary road shocks, but will only operate in the event of a major shock, like an overturn. It will be obvious that in place of the two compression springs 35 a single tension spring may be connected between said bolts 22 to urge them toward one another.

In the operation of either form of the invention, the hatch 11 is installed with the central arm 42 of the T-lever 41 extending lenghtwise of the vehicle, and with the bolts 22 arranged crosswise of the vehicle roof. So long as the vehicle is moving in its normal manner, the hatch 11 remains securely closed, with the T-lever 41 yieldably held in its locking position either by the detent 52, 53 of Figures 1 to 3 inclusive, or by the notches 61 of Figure 4.

If, however, a highway accident occurs, and in consequence of this, the bus or other vehicle turns over on its side, the hatch 11 becomes repositioned in a vertical plane with the vertical direction coinciding with the line 2—2 in Figure 1. In other words, it is as if the drawing were viewed from one of the other of its long sides. When this occurs, the pendulum arm 42 is thrown into a horizontal position with a severe jolt which is sufficient to detach the pendulum weight 43 from its detent 52 (Figures 1 and 3) or to jolt the rollers 47 out of the notches 61 (Figure 4). In either case, the pendulum weight will swing until the cross arm 44 is at an oblique angle to the line 2—2, permitting the bolts 22 to be moved toward one another, withdrawing their latch bars 23 from the recesses 18. When this occurs, the hatch 11, which is thus unlocked, either flies open of its own accord by the shock of the accident, or may be easily pushed open by a passenger within the bus or pulled open by someone outside. In the latter case, the hatch 11 may be pulled open by placing the fingers beneath the lip or flange 21 or by inserting a prying instrument between the flange 21 and the top 10. The passengers who might otherwise be entrapped within the bus, may then escape through the opening 13 to safety.

What I claim is:

1. A self-releasing locking device for releasably locking a vehicle roof escape hatch member to a roof member, said locking device comprising a latch bolt slidably mounted on the other of said members, a yielding element urging said latch bolt toward its unlatching position, and a weighted pendulum lever pivotally mounted on said other member and releasably engaging said latch bolt, said pendulum lever being of angle form with the outer end of one arm engaging said latch bolt and with the outer end of the other arm carrying the pendulum weight.

2. A self-releasing locking device for releasably locking a vehicle roof escape hatch structure to a pair of keepers on opposite sides of an escape opening in a roof structure, said locking device comprising a pair of latch bolts slidably mounted on the other of said structures and movable in opposite directions into engagement with said keepers, a yielding element engaging said latch bolts and urging said latch bolts toward one another away from latching engagement with said keepers, and a weighted pendulum lever pivotally mounted on said other structure and releasably engaging said latch bolts in freely-separable abutting engagement.

3. A self-releasing locking device for releasably locking a vehicle roof escape hatch structure to a pair of keepers on opposite sides of an escape opening in a roof structure, said locking device comprising a pair of latch bolts slidably mounted on the other of said structures and movable in opposite directions into engagement with said keepers, a yielding element engaging said latch bolts and urging said latch bolts toward one another away from latching engagement with said keepers, and a weighted pendulum lever pivotally mounted on said other structure and releasably engaging said latch bolts, said pendulum lever being of T-shaped form with the outer end of its cross arm engaging said latch bolts and with the outer end of its other arm carrying the pendulum weight.

4. A self-releasing locking device for releasably locking a vehicle roof escape hatch structure to a pair of keepers on opposite sides of an escape opening in a roof structure, said locking device comprising a pair of latch bolts slidably mounted on the other of said structures and movable in opposite directions into engagement with said keepers, a yielding element engaging said latch bolts and urging said latch bolts toward one another away from latching engagement with said keepers, a weighted pendulum lever pivotally mounted on said other structure and releasably engaging said latch bolts, said pendulum lever being of T-shaped form with the outer end of its cross arm engaging said latch bolts and with the outer end of its other arm carrying the pendulum weight, and a detent releasably engaging said pendulum lever.

5. A self-releasing locking device for releasably locking a vehicle roof escape hatch structure to a pair of keepers on opposite sides of an escape opening in a roof structure, said locking device comprising a pair of latch bolts slidably mounted on the other of said structures and movable in opposite directions into engagement with said keepers, a yielding element engaging said latch bolts and urging said latch bolts toward one another away from latching engagement with said keepers, a weighted pendulum lever pivotally mounted on said other structure and releasably engaging said latch bolts, said pendulum lever being of T-shaped form with the outer end of its cross arm engaging said latch bolts and with the outer end of its other arm carrying the pendulum weight, and a detent releasably engaging said pendulum lever at the opposite ends of said cross arm.

6. A self-releasing locking device for releasably locking a vehicle roof escape hatch structure to a pair of keepers on opposite sides of an escape opening in a roof structure, said locking device comprising a pair of latch bolts slidably mounted on the other of said structures and movable in opposite directions into engagement with said keepers, a yielding element engaging said latch bolts and urging said latch bolts toward one another away from latching engagement with said keepers, a weighted pendulum lever pivotally mounted on said other structure and releasably engaging said latch bolts, said pendulum lever being of T-shaped form with the outer end of its cross arm engaging said latch bolts and with the outer end of its other arm carrying the pendulum weight, and a detent releasably engaging said pendulum lever at the end of the pendulum weight arm of said lever.

ROBERT KERR.

REFERENCES CITED

The following references are of record in the file of this patent:

UNITED STATES PATENTS

| Number | Name | Date |
|---|---|---|
| 912,211 | Voight | Feb. 9, 1909 |
| 2,389,315 | Kerr | Nov. 20, 1945 |
| 2,481,429 | Kerr | Sept. 6, 1949 |

FOREIGN PATENTS

| Number | Country | Date |
|---|---|---|
| 24,033 | Great Britain | Nov. 5, 1903 |